Feb. 7, 1933.  A. G. RONNING  1,896,754
ENGINE
Original Filed Oct. 14, 1927  2 Sheets-Sheet 2

Inventor
Andrean G. Ronning, deceased
by Adolph Ronning and
Jacob A. Ronning, Executors
BY
ATTORNEY Patented Feb. 7, 1933

1,896,754

UNITED STATES PATENT OFFICE

ANDREAN G. RONNING, DECEASED, LATE OF MINNEAPOLIS, MINNESOTA, BY ADOLPH RONNING AND JACOB A. RONNING, JOINT EXECUTORS, OF MINNEAPOLIS, MINNESOTA

ENGINE

Original application filed October 14, 1927, Serial No. 226,199. Divided and this application filed August 6, 1930. Serial No. 473,474.

This invention relates to engines or power units and the primary object is to provide a machine in which the expansive properties of gases are utilized to run a power transmitting element such as a rotatable shaft. The present application is a division of a copending application Ser. No. 226,199, filed October 14, 1927, now Patent No. 1,776,374 issued Sept. 23, 1930 for combination land and air machine.

In the accompanying drawings, which illustrate a preferred embodiment of the invention, Fig. 1 is a plan view of the machine, with various parts broken away and others shown in section for purpose of illustration.

Figure 1:
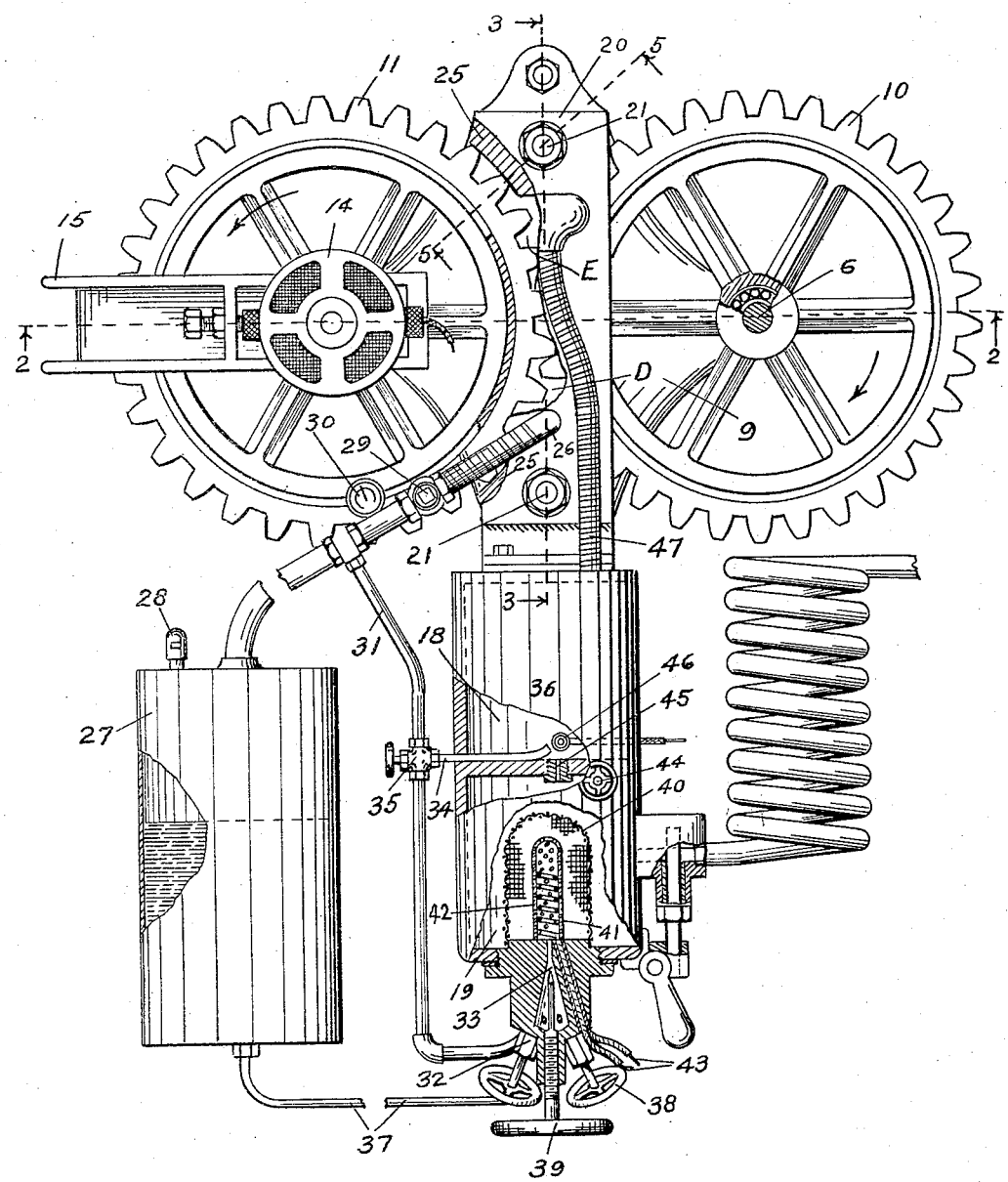
Figure 2:
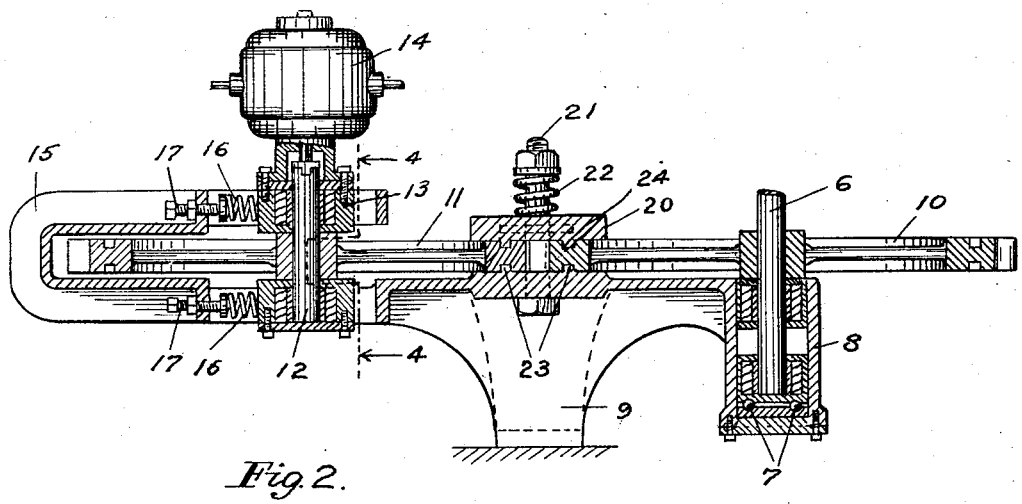
Fig. 2 is a sectional elevation on the line 2—2 in Fig. 1.
Figures 4, 5:
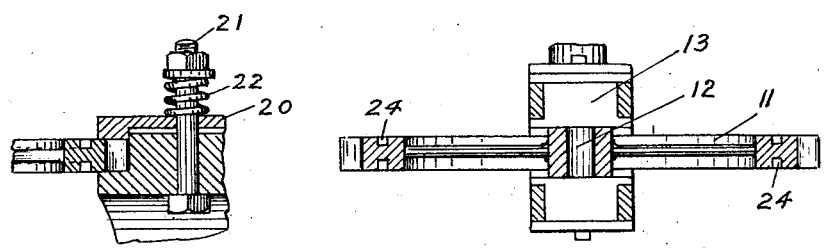
Fig. 4 is a sectional elevation about as on the line 4—4 in Fig. 2.
Fig. 5 is a detail elevation, as on the section line 5—5 in Fig. 1.
Figure 3:
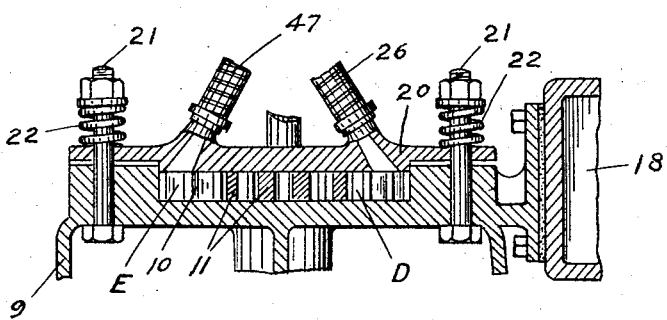
Fig. 3 is a sectional elevation on the line 3—3 in Fig. 1.

Referring to the drawings more particularly and by reference characters, 6 designates a shaft by which power is transmitted to mechanisms to be driven by the machine. This shaft rests on thrust bearings 7 in a bearing box 8, carried on a base member or main frame 9. The shaft 6 is driven by a large spur gear 10 that meshes with a similar gear 11 on a stub shaft 12. The shaft 12 is journaled in a bearing block 13 that also supports a generator 14. The bearing block is slidably arranged in the U-shaped yoke extension 15, of the base 9, and is spring held (toward the right, in Fig. 2) by springs 16 and set screws 17, so that the gears 10 and 11 will always be held tightly in mesh. The generator 14 is primarily employed to supply current to, or to charge a battery (not shown), for the ignition system to supply ignition sparks or electric heat in the chambers 18 and 19.

A rectangular plate 20 is placed over the adjoining sections of the gears 10 and 11, and is firmly pressed down upon the same, by bolts 21 having compression springs 22, thus firmly holding the gears in close contact with the members 9 and 20. To further seal these contacts he provided the last mentioned members with ribs 23 which engage in grooves 24 in the gears. As the teeth of the gears approach each other they close with or against a post or end wall 25 of the base 9, with a result that a confined chamber D is formed by the two gears, the wall 25 and the plate members above and below the gears. It will now be seen that as the gears rotate, in the direction of the arrows, the spaces between the teeth will cause small charges of air to be passed into the chamber D, and, as the gears then mesh the teeth of each gear will displace the air charges in the spaces of the other gear, with a result that the air in the chamber D is constantly being replenished and compressed, and under such pressure can only escape through a conduit 26 that leads to the fuel tank 27. The fuel tank is thus always under pressure, as is required in this power unit, but a pressure release valve 28 is provided as a safety measure. A check valve 29 is provided in the conduit 26 to prevent a back pressure in the chamber D, and the conduit is preferably also provided with a gauge 30 whereby the pressure in the system may be observed at any time.

The conduit 26 has a branch pipe 31 which supplies air under pressure to the needle valve 32 of a burner nozzle 33 of the Diesel type, and a branch 34, controlled by a valve 35 supplies air under pressure to a nozzle 36.

A fuel pipe 37 connects the fuel tank 27 to a needle valve 38 of the nozzle 33. Thus, the mixture of air and gas may be regulated, as may be found necessary. The supply of fuel proper is regulated by a third needle valve 39.

At the outlet of the nozzle 33 is provided a burner mantle 40, and within the mantle is a fuel preheating device consisting of a perforated cup 41, about the inner surface of which is arranged a hot wire heating element 42, connected to the ignition wires 43. When the current is turned on the cup 41 becomes very hot, and ignites the combustible gases that are discharged from the nozzle 33, as such gases are ejected through the perforations in the cup. After the mantle 40 has become thoroughly heated, and combustion is complete, the current to the preheater may be switched off.

The mantle 40 is preferably of the so-called Welsbach type consisting of an asbestos woven fabric, formed of thorium dioxide ($ThO_2$) ninety-nine per cent, and cerium dioxide ($CeO_2$), one per cent.

As far as the present invention is concerned, gas or air may be supplied to a chamber E in any suitable manner and from any convenient source. In the instant case, however, a valve 44 controls a port or nozzle 45 which connects the chambers 19 and 18 immediately adjacent to the air feed nozzle 36. As the gases produced in the chamber 19 are injected through the port 45, and under high pressure, against the compressed air stream from the nozzle 36, the resulting mixture becomes combustible, and burns with an intense heat in the chamber 18, some means such as a spark plug 46 being employed to start the combustion. As the burning gases expand in the chamber 18, they are forced through a conduit 47, to a chamber E, which is substantially identical with the previously described chamber D, but instead of being a compression chamber fed by the gears it is an expansion chamber in which the expansive characteristics of the gases are utilized to drive the gears by an operation, which is just the reverse of that in the chamber D.

It is understood that suitable modifications may be made in the general design and structural details of the invention herein shown and described, provided, however, that said modifications come within the spirit and scope of the appended claims. Having now therefore fully shown and described this invention, what is claimed to be new and desired to be protected by Letters Patent is:

1. A device of the character described having an expansion chamber defined in part by peripheral portions of a pair of intermeshing gears, and a closure plate held in resilient contact therewith by adjustable springs.

2. A device of the character described comprising a chamber defined in part by peripheral portions of a pair of intermeshing gears, and a closure plate held in resilient contact therewith, said gears and plate being provided with interlocking tongues and grooves to insure a sealing contact therebetween.

3. A device of the character described comprising a base member, a pair of intermeshing gears mounted thereon, a pair of end walls at opposite sides of the median line between the two gears, and a plate member in contact with the gears and combining therewith and with said base and end walls to form a pair of chambers, and separately adjustable spring devices for yieldably pressing the plate member against the gears.

4. A device of the character described comprising a base member, a pair of intermeshing gears mounted thereon, a pair of end walls at opposite sides of the median line between the two gears, and a plate member in contact with the gears and combining therewith and with said base and end walls to form a pair of chambers, bolt members extending from the base member and through the plate member, and adjustable springs on said bolt members tending to close the plate and base member toward each other.

Signed at Minneapolis, Minnesota, this 4th day of August, 1930.

ADOLPH RONNING,
JACOB A. RONNING,
*Joint Executors of the Estate of Andrean G. Ronning, deceased.*